United States Patent Office 2,839,443
Patented June 17, 1958

2,839,443

ADHESION OF TEXTILE FABRIC TO BUTYL RUBBER

John J. Fleming, Grosse Pointe Woods, Mich., assignor to United States Rubber Company, New York, N. Y., a corporation of New Jersey No Drawing. Application November 5, 1954
Serial No. 467,235

4 Claims. (Cl. 154—139)

This invention relates to an improved adhesive material, and more particularly to an improved method of adhering butyl rubber to textile fabric, as well as to improved laminates so obtained.

The invention is based on the discovery that butyl rubber can be adhered to textile fabric with the aid of an adhesive comprised of butyl rubber that has been subjected to a partial vulcanization treatment and thereafter mixed with a phenol-formaldehyde resin.

The need for the present invention arises from the fact that it has heretofore proven difficult to adhere butyl rubber to textile fabric by means of known adhesives and methods. Thus, a limiting factor in the development of butyl rubber pneumatic tires has been the inadequate adhesion of this rubber to the tire cord, particularly tire cord based on nylon. Prior attempts to use standard tire cord adhesives for adhering butyl rubber to such carcass reinforcing materials as nylon have been unsuccessful, probably because butyl rubber is in general not compatible with the types of rubber for which the usual tire cord adhesives were designed.

While there have been certain suggestions for special cements for adhering butyl rubber to textiles, such cements have not readily lent themselves to factory processing.

The term butyl rubber as used in connection with this invention has reference to the well-known type of synthetic rubber made by copolymerizing an isolefin, usually isobutylene, with a minor proportion of a conjugated diolefin, usually isoprene or butadiene. The isolefins used generally have from 4 to 7 carbon atoms, and such isolefins as isobutylene or ethyl methyl ethylene are preferred. The diolefins employed usually are ordinary open-chain conjugated diolefins having from 4 to 8 carbon atoms. The butyl rubber contains only relatively small amounts of copolymerized diene, typically from about 0.5 to 5%, and seldom more than 10%, on the total weight of the elastomer.

The invention involves preparation of an adhesive material by first chemically modifying butyl rubber to a limited extent with the aid of a curing or vulcanizing agent therefor. Suitable curatives include sulfur (in amount, for example, of from 0.5 to 3 parts per 100 parts of butyl rubber); ultra accelerators of sulfur vulcanization, such as a thiuram accelerator, e. g., a tetraalkyl thiuram monosulfide or disulfide, especially tetramethyl thiuram disulfide, or a dithiocarbamate accelerator, e. g., a zinc, tellurium or selenium dialkyl dithiocarbamate, dibenzyl dithiocarbamate or N-pentamethylene dithiocarbamate, (in amount, for example, of from 0:1 to 1.0 part); or combinations of sulfur and ultra accelerators, e. g., mixtures of sulfur and tetraalkyl thiuram monosulfides or disulfides (in amount, for example, of from 0.05 to 0.2 part of sulfur and from 0.02 to 0.2 part of ultra accelerator); para-dinitrosobenzene, meta-dinitrosobenzene (in amount, for example, of from 0.1 to 0.4 part); mixtures of p-quinone dioxime and an oxidizing agent such as red lead (in amount, for example, of from 0.02 to 0.075 part of para-quinone dioxide and from 0.1 to 0.3 part of the oxidizing agent); and 4-hydrocarbon-2,6-dimethylolphenols and resinous self-condensation products thereof (in amount, for example, of from 0.25 to 3 parts).

The treatment of the butyl rubber with a curing or vulcanizing agent in accordance with the invention is carried out with the aid of heat, but it is a limited treatment, that is, the butyl rubber is not converted into a truly cured or vulcanized condition, but is only partially modified by the curing agent, so that it is still a processible material. The heat treatment of butyl rubber with the curing agent can be effected at temperatures as low as about 235° F., although at such comparatively low treatment temperatures rather prolonged heating times, of the order of 5 to 24 hours are necessary, particularly under static conditions. The treatment can be effected more rapidly at temperatures ranging upwardly from 235° F. to the point at which the stock would be injured by thermal decomposition. It is preferred to use a treating temperature of the order of from 300 to 450° F., preferably while masticating the butyl rubber and the curing agent together in an internal mixer, for a period of time ranging from 5 to 15 minutes.

Carbon black or other suitable fillers or compounding ingredients may be present during the treatment if desired, in amount, for example, of from 20 to 80 parts per 100 parts of the butyl rubber.

The preferred curing agent for use in modifying the butyl rubber in accordance with the invention is a 4-hydrocarbon-2,6-dimethylolphenol, particularly in the form of its resinous self-condensation product. The 4-substituted-2,6-dimethylolphenols are typically made by reacting a para-substituted phenol having the two ortho positions unoccupied with a considerable molar excess of formaldehyde, the molar ratio of formaldehyde to phenol typically being 2:1, in the presence of a strong alkaline catalyst, especially an alkali metal hydroxide, which is subsequently neutralized. With proper care, the reaction can be advanced to a resinous stage in which the product is in a soluble (in conventional organic solvents and drying oils) and fusible state. Resins of this kind are commercially available, and they are known as resol types of resin. They are truly heat-reactive materials, that is, they can be further polymerized by the action of heat, without necessity for adding any further formaldehyde or formaldehyde-yielding agent, because they contain terminal methylol groups.

The 4- or para-substituents in the dimethylolphenol are exemplified by alkyl groups, especially alkyl groups having from 3 to 20 carbon atoms, tertiary-butyl and tertiary octyl (alpha, alpha, gamma, gamma-tetramethyl butyl) being especially preferred, cycloalkyl groups, aryl groups such as phenyl and aralkyl groups such as benzyl and cumyl. Examples of such dimethylolphenols that may be used to chemically modify the butyl rubber are as follows:

2,6-dimethylol-4-methyl phenol
2,6-dimethylol-4-tertiary butyl phenol
2,6-dimethylol-4-octyl phenol
2,6-dimethylol-4-dodecyl phenol
2,6-dimethylol-4-phenyl phenol
2,6-dimethylol-4-benzyl phenol
2,6-dimethylol-4-alpha, alpha-dimethyl benzyl phenol
2,6-dimethylol-4-cyclohexyl phenol In producing the adhesive materials of the invention, the reaction between the butyl rubber and the 4-substituted-2,6-dimethylolphenol is most preferably carried out in the presence of a heavy metal chloride, which acts as an accelerator for the reaction. Tin chloride, iron chloride and zinc chloride may be mentioned as exemplifying the heavy metal chlorides, and they are typically employed in amount within the range of from 0.1 to 10 parts per 100 parts of the butyl rubber. The use of metal halides as accelerators for the reaction between butyl rubber and para-substituted dimethylolphenols is disclosed in more detail in copending application Serial No. 329,444 of Peterson et al., filed January 2, 1953, now U. S. Patent No. 2,726,224.

The chemical modification of the butyl rubber carried out with the curing agent as directed is such as to essentially exhaust the action of the curing agent, although, as indicated previously, the amount of reagent and the reaction conditions are such that the thus-modified butyl rubber is still uncured and processible, and it is susceptible of subsequent true or complete vulcanization under the influence of further added quantities of curative.

The chemical pre-treatment of the butyl rubber is accompanied by an increase in viscosity, and this phenomenon affords a convenient criterion of the sufficiency of the pre-treatment. In general, sufficient modifying reagent is employed so that when the action of the modifying reagent is exhausted the Linhorst plasticity value will have increased by 0.002 to 0.050 unit (three minute reading in inches at 212° F. on a 0.075 gage sample) over the initial value for the unmodified butyl rubber. When employed in the amounts disclosed above, the modifying reagents will provide automatically the specified increase in Linhorst plasticity number. The method of determining the Linhorst plasticity number is disclosed in detail in India Rubber World, August 1953, page 626.

In accordance with the invention, the butyl rubber that has thus been chemically modified by limited reaction with a para-hydrocarbon substituted dimethylolphenol is thereafter mixed intimately, in amount of 100 parts, with from 15 to 50 parts of a phenol-formaldehyde resin of the type that is capable of being converted by heat to the permanently infusible state in the presence of formaldehyde, or a methylene-yielding curing agent of the type commonly used for curing phenolic resins, such as hexamethylenetetramine or para-formaldehyde. Such phenolic resins are of the novolac type as distinguished from the inherently heat-reactive resol type previously described as preferred reagents for the pre-reaction of the butyl rubber. The novolac resins are not dimethylol phenols and they are made by limited condensation of phenol with formaldehyde usually in the presence of an acid catalyst, the ratio of phenol to formaldehyde in the reaction mixture being maintained high enough so that the formaldehyde present reacts to form essentially only linear polymer chains with the phenol, there being insufficient formaldehyde to form cross-links between the polymer chains, which would result in an infusible, insoluble product. The novolac type of resin is insoluble in water and is distinguished from the resol type which is usually prepared in an alkaline medium, using larger quantities of formaldehyde. The novolacs are distinguished by the fact that, practically speaking, they are permanently fusible and soluble and do not harden upon being heated unless a curing agent in the form of additional formaldehyde is added.

Preferably the phenolic resin is one which has been modified with cashew nut shell oil. Such modified phenolic resins are well-known commercially available materials, as typified by the resin sold under the trade-designation "Durez No. 12686," which is made from cashew nut shell oil and a lower molecular weight phenol. Frequently the commercial form of the resin already contains a sufficient quantity of a methylene-yielding curing agent to render it heat-hardenable, as in the case of the material sold under the trade-designation "Durez No. 12687," which is believed to be a mixture of 92 parts of cashew nut shell oil modified phenolic resin and 8 parts of hexamethylenetetramine. Other commercially available cashew nut shell oil modified phenolic resins, containing a curing agent, are the materials known in the trade as Varcum 9820 and Varcum 9831. If the resin does not already contain a formaldehyde-yielding substance, from 1 to 12 parts of such substance should be added to the mixture, per 100 parts of the butyl rubber.

The adhesion process is also aided by the presence at this stage of an additional quantity of heavy metal halide, such as from 0.5 to 3 parts of stannous chloride dihydrate.

The mixture of chemically modified butyl rubber and phenol-formaldehyde resin at this stage is further compounded with additional curing agent for the butyl rubber in amount sufficient to substantially complete the cure of the butyl rubber. It has been noted previously that the butyl rubber reacted with limited amounts of curative as described is still an uncured, processible, and curable material. The further quantities of curing agent added at the present stage will be sufficient to effect a true or substantially complete cure, rendering the butyl rubber unprocessible. The amount of curing agent necessary to bring about this result will be the same as the amount conventionally employed to cure butyl rubber in the ordinary manner, that is, there is no need to take into account or compensate for the first amount of curative used in the preliminary modification reaction, because such preliminary curative was used in only a relatively small amount compared to that necessary to bring about full cure. The mixing of the chemically modified butyl rubber, phenol-formaldehyde resin and additional curing agent for the butyl rubber is carried out according to standard mixing procedures, the conditions being such that no pre-cure or pre-vulcanization takes place.

The foregoing composition is interposed between the textile material and the particular butyl rubber stock that it is desired to adhere to the textile material. Thus, if it is desired to adhere tire cord fabric to a layer of vulcanizable butyl rubber carcass stock, the tire cord fabric is first coated with the described composition of chemically modified butyl rubber, phenol-formaldehyde resin, and final curing agent for the butyl rubber. Thereafter, the vulcanizable butyl rubber carcass stock is superimposed on the assembly, and the resulting laminate is subjected to conventional vulcanizing conditions. Such vulcanizing conditions result in cure of the butyl rubber carcass stock, as well as cure of the mixture of chemically modified butyl rubber and phenol-formaldehyde resin, constituting the adhesive layer. During the vulcanization period the phenol-formaldehyde component of the adhesive layer becomes cured to a thermoset condition under the influence of the formaldehyde-yielding substance present therein, while the modified butyl rubber component of the adhesive becomes substantially completely cured under the influence of the added final curative for butyl rubber present therein.

Adhesive compositions of the invention may be applied to the tire cord fabric or other fabric by any suitable means. If desired, the adhesive composition, which much resembles compounded rubber stocks in consistency, may be calendered onto the fabric. Also, the adhesive composition may if desired be combined with a suitable liquid carrier, such as by dissolving the composition in a suitable volatile solvent, such as hexane, and thereafter applied to the textile by spreading, dipping, spraying or brushing, followed by evaporation of the solvent, with the aid of moderate heat if desired.

The butyl rubber member or body which is adhered to a textile material by the use of the adhesive composition of the invention as an intermediate layer may be compounded as desired in accordance with any suitable conventional practice, and may include any of the usual vulcanizing agents for butyl rubber in conventional amounts, as well as carbon black and other modifying or compounding ingredients. The vulcanizable butyl rubber member may be cured by subjecting to heat in accordance with conventional practice at temperatures ranging, for example, from 220° F. to 350° F. or higher, for periods of time ranging from 4 minutes to 12 hours. It will be understood that the amount of curing agent included in the butyl rubber body will be that sufficient to effect substantially full or complete vulcanization of the butyl rubber, in accordance with well-known conventional practice.

The following examples, in which all parts are expressed by weight, will serve to illustrate the practice of the invention in more detail.

*Example I*

This example illustrates the adhesion of cotton tire cord to a butyl rubber tire carcass stock by the method of the invention.

The following ingredients are reacted by mixing in a Banbury mixer for a period of 10 minutes at a temperature of 325–375° F.:

| | Parts |
|---|---|
| Butyl rubber (GR–I 17) | 100.0 |
| Carbon black (MPC) | 50.0 |
| Stearic acid | 1.0 |
| Amberol ST–137 resin | 2.0 |
| Stannous chloride dihydrate | 1.5 |

Amberol ST–137 is a commercially available p-substituted dimethylolphenol resin, believed to be made from about 1 mole of p-octyl phenol, 2 moles of formaldehyde and 1 mole of sodium hydroxide, the alkali being carefully neutralized after the condensation is complete. The stannous chloride serves to accelerate the chemical reaction between the dimethylolphenol resin and the butyl rubber, and under the conditions described the action of the dimethylolphenol is substantially exhausted. The action of the dimethylolphenol on the butyl rubber is evidenced by a decrease in plasticity and an increase in insoluble gel content.

After completion of the foregoing pre-treatment, the following ingredients are added to the modified butyl rubber in a final mix:

| | Parts |
|---|---|
| Zinc oxide | 5.00 |
| Durez resin 12687 | 30.00 |
| Stannous chloride dihydrate | 1.00 |
| Tellurium diethyldithiocarbamate | 1.25 |
| Sulfur | 2.00 |

The Durez resin 12687 is a commercial novolac phenol-formaldehyde resin modified by cashew nut shell oil and containing 8% hexamethylenetetramine. The added tellurium diethyldithiocarbamate and sulfur are sufficient to cause vulcanization of the modified butyl rubber to a finally cured state. These materials are masticated with the pre-treated butyl rubber for the minimum time necessary to incorporate them, and during this mixing the temperature is maintained below about 260° F.

The foregoing processible, rubbery composition is calendered onto cotton tire cord fabric on a calender in the form of a thin layer to serve as an adhesive. Thereafter a vulcanizable butyl rubber carcass stock is applied in the form of a thin layer superimposed on the layer of adhesive composition.

The assembly is then cured in a mold for about 40 minutes at a temperature of about 307° F. The butyl rubber carcass stock is thereby bonded to the fabric, through the medium of the adhesive layer, whereas if such adhesive layer is omitted, the butyl carcass stock does not adhere to the fabric. When tested by a dynamic adhesion method of the same general type as disclosed by Pittman et al., "Dynamic Compression Test for Adhesion of Rubber to Cord Fabric," Rubber Chemistry and Technology, vol. 23 (1950), page 921, the invention gave values of 20 to 50 minutes, compared to only 0 to 3 minutes for a control prepared in accordance with prior practice.

*Example II*

The foregoing example is repeated, except that the cotton tire cord is first treated with an aqueous solution of sodium rosinate in accordance with the method of U. S. Patent 2,297,536 to H. M. Buckwalter. The adhesion is greatly enhanced even more so than in Example I, the dynamic test giving values of 45 to 115 minutes.

*Example III*

Example I is repeated, using nylon tire cord, in place of cotton cord. The nylon is first given a preliminary treatment with a primer material based on a standard mixture of neoprene latex and resorcinol-formaldehyde resin. The adhesive composition of Example I is then applied and a butyl rubber carcass stock is again vulcanized in contact therewith as before. Excellent adhesion is attained, the dynamic values being of the order of 90 to 180 minutes.

Having thus described my invention, what I claim and desire to protect by Letters Patent is:

1. An adhesive composition for adhering a synthetic rubbery copolymer of an isoolefin having 4 to 7 carbon atoms with 0.5 to 10% of an open-chain conjugated diolefin having 4 to 8 carbon atoms to textile materials, comprising 100 parts of said synthetic rubber pre-reacted with sufficient curative selected from the group consisting of sulfur, ultra accelerators of sulfur vulcanization, dinitrosobenzenes, p-quinone dioxime with an oxidizing agent, and 4-hydrocarbon-2,6-dimethylolphenols to increase the Linhorst plasticity number by from 0.002 to 0.050 units, from 15 to 50 parts of a novolac phenol-formaldehyde resin and a methylene-yielding hardening agent therefor selected from the group consisting of hexamethylenetetramine and para-formaldehyde, and sufficient additional curative selected from the aforesaid group to vulcanize the said pre-reacted rubber.

2. A method of adhering a synthetic rubbery copolymer of an isoolefin having 4 to 7 carbon atoms with 0.5 to 10% of an open-chain conjugated diolefin having 4 to 8 carbon atoms to a synthetic textile which is a resinous, thermoplastic, linear polymer of a hexamethylenediamine salt of adipic acid, comprising preparing an adhesive by pre-reacting 100 parts of said rubber with from 0.25 to 3 parts of a 4-hydrocarbon-2,6-dimethylolphenol and from 0.1 to 10 parts of a heavy metal chloride at a temperature of from 235° F. to 450° F., mixing said pre-reacted rubber with from 15 to 50 parts of a cashew nut shell oil modified novolac phenol-formaldehyde resin and hexamethylenetetramine as a methylene-yielding hardening agent therefor, and with sulphur and an ultra accelerator of sulphur vulcanization as additional curative in amounts sufficient to vulcanize the said pre-reacted rubber, interposing the resulting adhesive composition between the said textile and a vulcanizable body of the said rubber to be adhered thereto, and curing the resulting laminate to firmly adhere the said body to the said textile.

3. A method as in claim 2 in which 0.5 to 3 parts of stannous chloride dihydrate are added after the said pre-reaction.

4. A laminate of a synthetic rubbery copolymer of an isoolefin having 4 to 7 carbon atoms with 0.5 to 10% of an open-chain conjugated diolefin having 4 to 8 carbon atoms and a synthetic textile which is a resinous, thermoplastic, linear polymer of a hexamethylenediamine salt of adipic acid joined together by an interposed layer of adhesive comprising 100 parts of the said rubber pre-reacted with from 0.25 to 3 parts of a 4-hydrocarbon-2,6-dimethylolphenol, 15 to 20 parts of a cashew nut shell oil modified novolac phenol-formaldehyde resin and a methylene-yielding hardening agent therefor selected from the group consisting of hexamethylenetetramine and paraformaldehyde, the said adhesive composition being cured.

References Cited in the file of this patent

UNITED STATES PATENTS

| | | |
|---|---|---|
| 2,701,895 | Tawney et al. | Feb. 15, 1955 |
| 2,702,287 | Iknayan et al. | Feb. 15, 1955 |
| 2,726,224 | Peterson et al. | Dec. 6, 1955 |
| 2,767,152 | Bierman et al. | Oct. 16, 1956 |

OTHER REFERENCES

A. P. C. application of Wildschut, Serial Number 357,662, published April 20, 1943.

Rubber Age, January 1947, page 449.